(12) United States Patent
Ceko

(10) Patent No.: US 9,702,162 B2
(45) Date of Patent: Jul. 11, 2017

(54) PULTRUDED OR EXTRUDED CROSS ARM STRUCTURES FOR UTILITY POLES

(71) Applicant: TRIDENT INDUSTRIES, LLC, Chicago, IL (US)

(72) Inventor: Peter Ceko, Barrington Hills, IL (US)

(73) Assignee: TRIDENT INDUSTRIES, LLC, Chicago ( * ) Notice: Subject to any disclaimer, the term of this patent is extended or adjusted under 35 U.S.C. 154(b) by 0 days.

(21) Appl. No.: 14/803,422

(22) Filed: Jul. 20, 2015

(65) Prior Publication Data

US 2016/0233657 A1 Aug. 11, 2016

Related U.S. Application Data

(60) Provisional application No. 62/112,297, filed on Feb. 5, 2015.

(51) Int. Cl.
*H02G 7/00* (2006.01)
*E04H 12/24* (2006.01)

(52) U.S. Cl.
CPC .............. *E04H 12/24* (2013.01); *H02G 7/00* (2013.01)

(58) Field of Classification Search
CPC .. H02G 3/0431; H02G 3/0437; H02G 3/0487; H02G 3/0493; H02G 3/06; H02G 3/0608; H02G 3/30; E04H 12/02; E04H 12/24; E04H 12/22; E04H 12/00; F16L 3/1218; F16L 3/1226; F16L 3/12; F16L 3/16
USPC ............ 174/24, 40 R, 45 R, 481, 68.1, 68.3, 174/88 R, 70 C, 95, 146; 248/49, 68.1; 52/220.3, 220.7, 843
See application file for complete search history.

(56) References Cited

U.S. PATENT DOCUMENTS

| | | | | |
|---|---|---|---|---|
| 5,661,263 A * | 8/1997 | Salvaggio | ............ | H02G 3/0462 174/68.3 |
| 6,143,984 A * | 11/2000 | Auteri | ................... | H02G 3/0608 174/68.3 |
| 6,347,488 B1 * | 2/2002 | Koye | ...................... | E04H 12/24 174/146 |
| 6,521,835 B1 * | 2/2003 | Walsh | .................. | H02G 3/0487 174/68.3 |
| 7,228,672 B2 * | 6/2007 | Hayes | ..................... | E04H 12/02 52/843 |
| 8,322,105 B2 | 12/2012 | Williams | | |
| 8,359,814 B2 | 1/2013 | Williams | | |
| 8,474,221 B1 | 7/2013 | Ceko | | |

* cited by examiner

*Primary Examiner* — Angel R Estrada
(74) *Attorney, Agent, or Firm* — Rimon, P.C.; Marc Kaufman

(57) ABSTRACT

An pultruded or extruded cross arm structure for a utility pole, comprising an elongated hollow structure having an outer surface and an inner portion, the inner portion comprising one or more compartments configured to receive a wire.

13 Claims, 5 Drawing Sheets

PULTRUDED OR EXTRUDED CROSS ARM STRUCTURES FOR UTILITY POLES

BACKGROUND OF THE INVENTION

This application is a non-provisional of U.S. Patent Appln. No. 62/112,297, filed Feb. 5, 2015 the contents of which are incorporated herein by reference.

Field of the Invention

The present invention is directed to an pultruded or extruded cross arm structure for a utility pole, comprising an elongated hollow structure having an outer surface and an inner portion, the inner portion comprising one or more compartments configured to receive a wire.

Background Art

Utility poles are used to assist with the transmission and distribution of electricity across large distances. Typically, a utility pole comprises a main pole, driven into the ground, and a cross-arm attached to the main pole. The cross-arm is generally located near the top of the main pole and facilitates the running of several wires across a series of poles.

Most utility poles used today are made entirely of wood. All wooden utility poles are pressure treated to preserve the wooden utility poles from the weather, insects and other types of attacks and decay. Utility poles are treated with a number of toxic chemicals including pentachlorphenol, chromated copper arsenate, creosote, copper azole and others.

There are several problems associated with wooden utility poles. One problem is that utility poles are heavy and bulky and hard to move and install. Wooden utility poles are also treated with chemicals that are harmful to the environment and poisonous (e.g. arsenic, etc.) to humans and animals. Furthermore, even with pressure treating the wood, wooden utility poles are susceptible to rot and deterioration, necessitating their replacement about every 25-30 years. Another danger of wooden utility poles is they present a substantial fire risk due to the ability of wood, even treated wood, to retain moisture, resulting in greater conductivity. The greater the conductivity, the greater the risk of fire.

Another risk with wooden utility poles involves the attachment of various wires (e.g., a grounding wire) to the main pole or cross arm. These wires are exposed to the elements and risk damage and erosion. Furthermore, the wires may come unattached to the utility pole as the condition of the wood deteriorates, causing wires to fall from the poles or cross arm.

There have been attempts to solve some of these problems. For example, U.S. Pat. No. 8,474,221 to Ceko discloses "Fiberglass Utility Poles." U.S. Pat. No. 8,359,814 to Williams discloses "Pultruded/extruded utility lighting, mounting and climbing structures."

However, there still exists a need for a cross-arm structure for a utility pole that can be used both with conventional wooden poles and modern poles that improves conditions for the transmission of electricity. The present inventions addresses these needs.

SUMMARY OF THE INVENTION

The present invention is directed to an pultruded or extruded cross arm structure for a utility pole, comprising an elongated hollow structure having an outer surface and an inner portion, the inner portion comprising one or more compartments configured to receive a wire.

In one embodiment, the present invention is directed to a pultruded or extruded cross arm structure for a utility pole, comprising a plurality of elongated hollow structures each having a length, an outer surface and an inner portion, each of the inner portions comprising one or more compartments configured to receive a wire, wherein each of the plurality of elongated hollow structures are nested coaxially.

In some embodiments, a cross arm of the present invention the one or more compartments extend the length of the elongated hollow structure. In other embodiments, the one or more compartments further comprise a conduit located within the compartment. In some embodiments, an inner portion further comprises insulating material. In some embodiments, the insulating material is foam.

A pultruded or extruded cross arm structure for a utility pole, comprising an elongated hollow structure having a length, an outer surface and an inner portion, the elongated hollow structure configured to receive a wire or a second elongated hollow structure. In some embodiments, the inner portion further comprises insulating material. In some embodiments, the insulating material is foam.

BRIEF DESCRIPTION OF DRAWINGS

The invention is described in detail below with reference to the appended drawings, wherein like numerals designate similar parts.

DETAILED DESCRIPTION OF THE INVENTION

Figure 1:
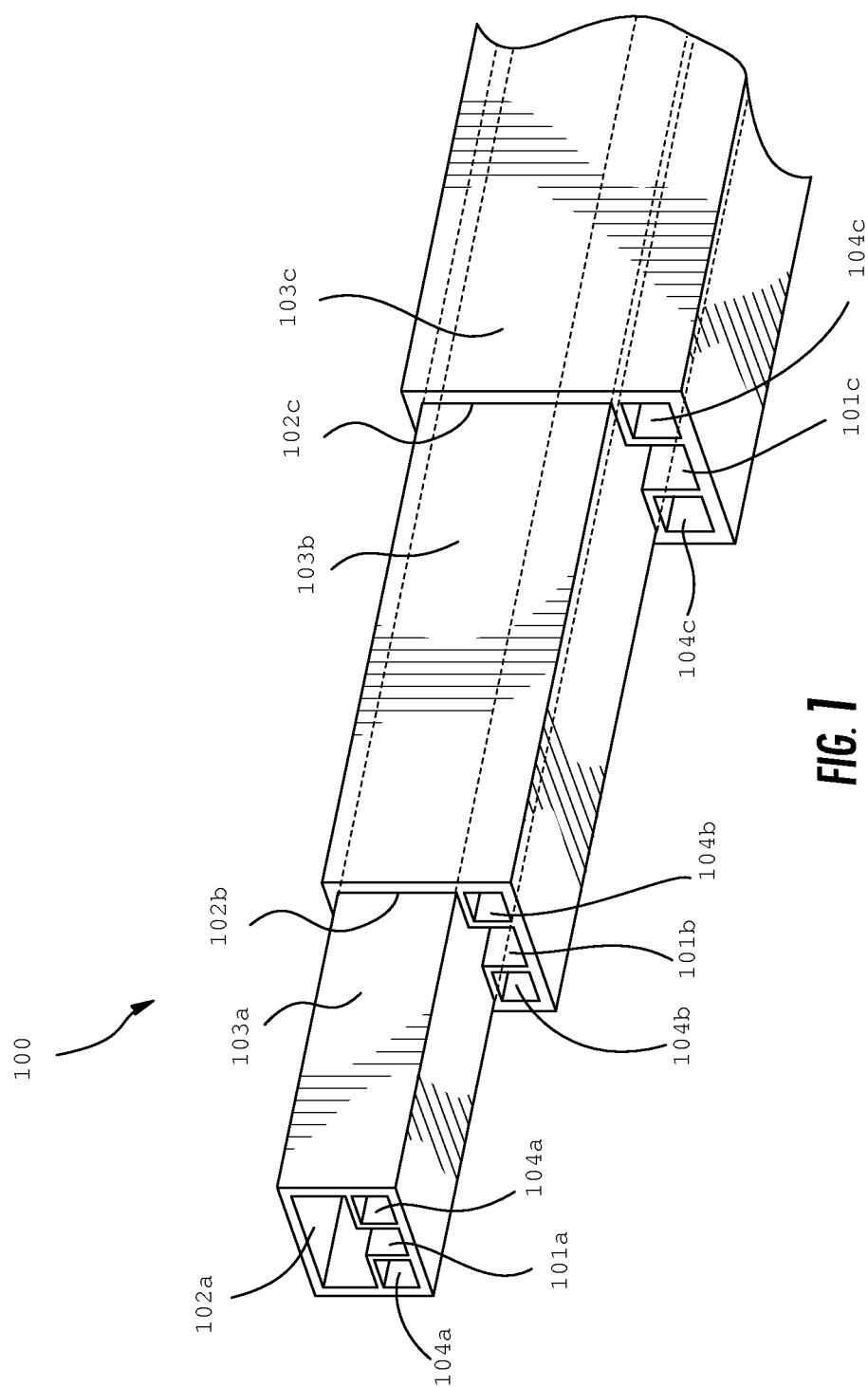
FIG. 1 shows a cross-arm of the present invention comprising three elongated hollow structures nested together.
Figure 2:
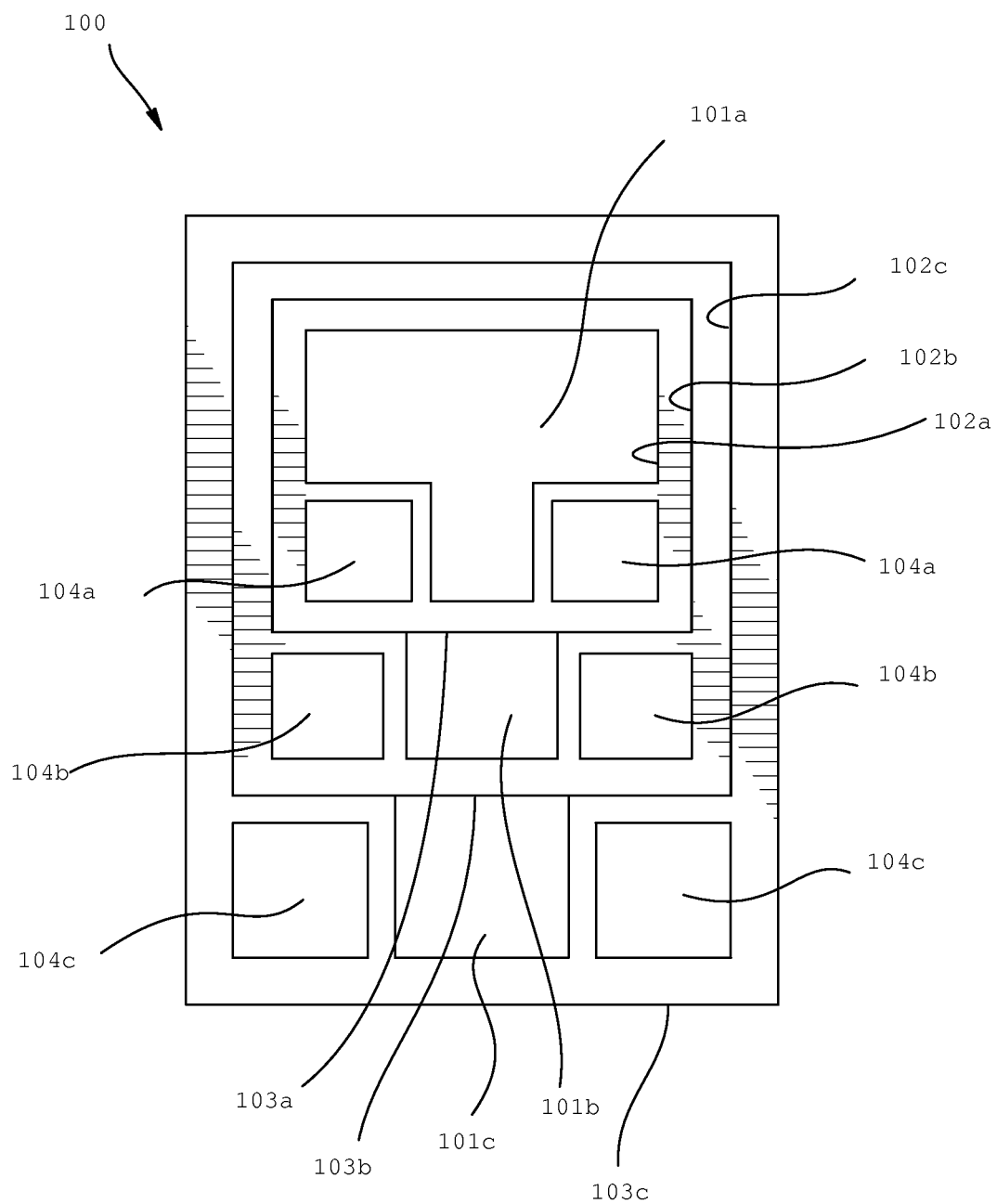
FIG. 2 shows a cross section of a cross-arm of the present invention comprising three elongated hollow structures nested together.

The present invention is directed to an pultruded or extruded cross arm structure for a utility pole, comprising an elongated hollow structure having an outer surface and an inner portion, the inner portion comprising one or more compartments configured to receive a wire.

In one embodiment, the present invention is directed to an pultruded or extruded cross arm structure for a utility pole, comprising a first elongated hollow structure having an outer surface and an inner portion, the inner portion comprising one or more compartments configured to receive a wire; a second elongated hollow structure having an outer surface and an inner portion, the inner portion comprising one or more compartments configured to receive a wire; wherein the second elongated hollow structure is nested coaxially within the first elongated structure.

In some embodiments, a cross arm of the present invention is a pultruded structure. As is known in the art, "pultrusion" is a manufacturing process for producing continuous lengths of materials. Pultrusion raw materials include a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelatin (or hardening) of the resin is initiated by the heat from the die and a rigid, cured profile is formed that corresponds to the shape of the die.

There are also pultruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultrusion process is normally continuous and highly automated. Reinforcement materials, such as roving, mat or fabrics, are positioned in a specific location using preforming shapers or guides to form a pultrusion. The reinforcements are drawn through a resin bath where the material is thoroughly coated or impregnated with a liquid thermosetting resin. The resin-saturated reinforcements enter a heated metal pultrusion die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultrusion die to the exact shape of the die cavity. The laminate solidifies when cooled and it is continuously pulled through the pultrusion machine and cut to the desired length. The process is driven by a system of caterpillar or tandem pullers located between the die exit and the cut-off mechanism.

In one embodiment the pultrusion resins include bisphenol-a epichlorohydrin-based vinyl esters. In another embodiment, the resins include polyesters including isophthalic, orthophthalic, propylene-maleate, fire resistant, and high cross-link density. However, the present invention is not limited to these resins and other resins can be used to practice the invention.

In one embodiment, the pultrusions include re-enforcing fibers comprising, fiberglass fibers, composite fibers, etc. However, the present invention is not limited to these fibers and other fibers can be used to practice the invention.

One resin used in fiberglass pultrusions is a thermoset resin. The resin used in Polyvinyl Chloride (PVC) pultrusions are typical thermoplastic resins. In the pultrusion process, under heat and pressure, the thermoset resins and re-enforcing fibers form a new inert material that is impervious to temperature. Pultruded fiberglass physical properties do not change through the full temperature cycle up to temperatures of about 200 degrees Fahrenheit. In direct contrast, PVC resins typically become unstable at temperatures greater than 155° F.

Pultrusions, include but are not limited to, structures comprising: (1) HIGH STRENGTH—typically stronger than structural steel on a pound-for-pound basis; (2) LIGHT-WEIGHT—Pultrusions are 20-25% the weight of steel and 70% the weight of aluminum. Pultruded products are easily transported, handled and lifted into place; (3) CORROSION/ROT RESISTANT—Pultruded products will not rot and are impervious to a broad range of corrosive elements; (4) NON-CONDUCTIVE—fiberglass reinforced pultrusions have low thermal conductivity and are electrically non-conductive; (5) ELECTRO-MAGNETIC TRANSPARENT—Pultruded products are transparent to radio waves, microwaves and other electromagnetic frequencies; (6) DIMENSIONAL STABILE—The coefficient of thermal expansion of pultruded products is slightly less than steel and significantly less than aluminum; (7) LOW TEMPERATURE CAPABLE—FiberGlass fiber reinforced pultrusions exhibit excellent mechanical properties at very low temperatures, even −70° F. Tensile strength and impact strengths are greater at −70° F. than at +80° F.; (8) AESTHETICALLY PLEASING—Pultruded profiles are pigmented throughout the thickness of the part and can be made to virtually any desired custom color. Special surfacing veils are also available to create special surface appearances such as wood grain, marble, granite, etc.; and (9) COST EFFECTIVE—pultruded products are cheaper than those made of metals, wood, etc. and other materials.

In some embodiments, a cross arm of the present invention is an extruded structure. "Extrusion" is a manufacturing process where a material is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

Plastic extrusion commonly uses plastic chips, which are heated and extruded in the liquid state, then cooled and solidified as it passes through the die. In some cases (such as fiber reinforced tubes) the extrudate is pulled through a very long die, in a process called "pultrusion."

In one embodiment, an extruded structure of the present invention comprises extruded plastic materials including, but not limited to, Polyvinyl Chloride (PVC), Acrylonitrile Butadiene Styrene (ABS), High Impact Polypropylene (HIP), Polypropylene, High-Density Polyethylene (HDPE), Polycarbonate, Polyethylene Terephthalate Glycol (PETG), Nylon, Fiber reinforced Polypropylene, Fiber Reinforced Polystyrene and other types of plastics. In another embodiment, an extruded structure comprises composite materials. In another embodiment, an extruded structure comprises recycled plastic materials.

An extruded structure is extruded in plural different colors (e.g., red, green, yellow, blue, brown, etc.) and is aesthetically pleasing. The plural different colors may blend in with a natural environmental setting or a pre-determined design scheme. For example, a new subdivision may include only blue extruded utility poles.

In one embodiment, it is estimated that an extruded structure would have a lifetime of over 60 years and be safe to the environment, humans and animals. An extruded structure of the present invention is resistant to damage from the weather, animals, insects and is corrosion resistant.

In some embodiments the inside of the elongated hollow structure is filled with insulating material. While not being bound to one particular theory, the insulating material provides additional strength to the cross-arm while also inhibiting seepage of water or condensation into the cross-arm. In some embodiments the insulating material is a conventional insulating material known to those of skill in the art. In some embodiments, the insulating material is a foam.

FIG. 1 depicts a cross-arm of the present invention (100). In this embodiment, three elongated structures are nested together to form a cross arm. Each elongated structure is hollow (101a, 101b, 101c), with an outer surface (103a, 103b, 103c) and an inner portion (102a, 102b, 102c). The inner portions further comprise two compartments (104a, 104b, 104c), configured to receive a wire.

In some embodiments, a plurality of elongated structures are nested together, wherein each structure can have the same or different lengths. For example, FIG. 1 depicts an embodiment of the invention having three elongated structures nested together, an innermost structure having a length that is longer than a middle and outer structures, a middle structure having a length shorter than an inner structure and longer than an outer structure, and an outer structure having a length shorter than both the inner and middle structures. By varying the lengths of each nested structure, fewer materials are required to construct the construct the cross arm, without significantly sacrificing strength. While FIG. 1 depicts an embodiment of the present invention having three structures nested together, the present invention is not limited in the amount of structures that may be nested together. Those of skill in the art will appreciate that cross-arms of the present invention may include as few, or as many, nested structures needed for a particular circumstance.

In some embodiments, a cross-arm of the present invention comprises one or more compartments configured to receive a wire. In some embodiments, the compartment comprises a cavity inside the elongated structure defined by the inner portion and one or more partitioning walls connected to the inner portion of the elongated structure. For example, FIG. 1 depicts a rectangular compartment defined by the inner portion (102a, 102b, 102c), a first partitioning wall, and a second partitioning wall. While FIG. 1 depicts one geometry, the present invention is not so limited.

Figure 3:
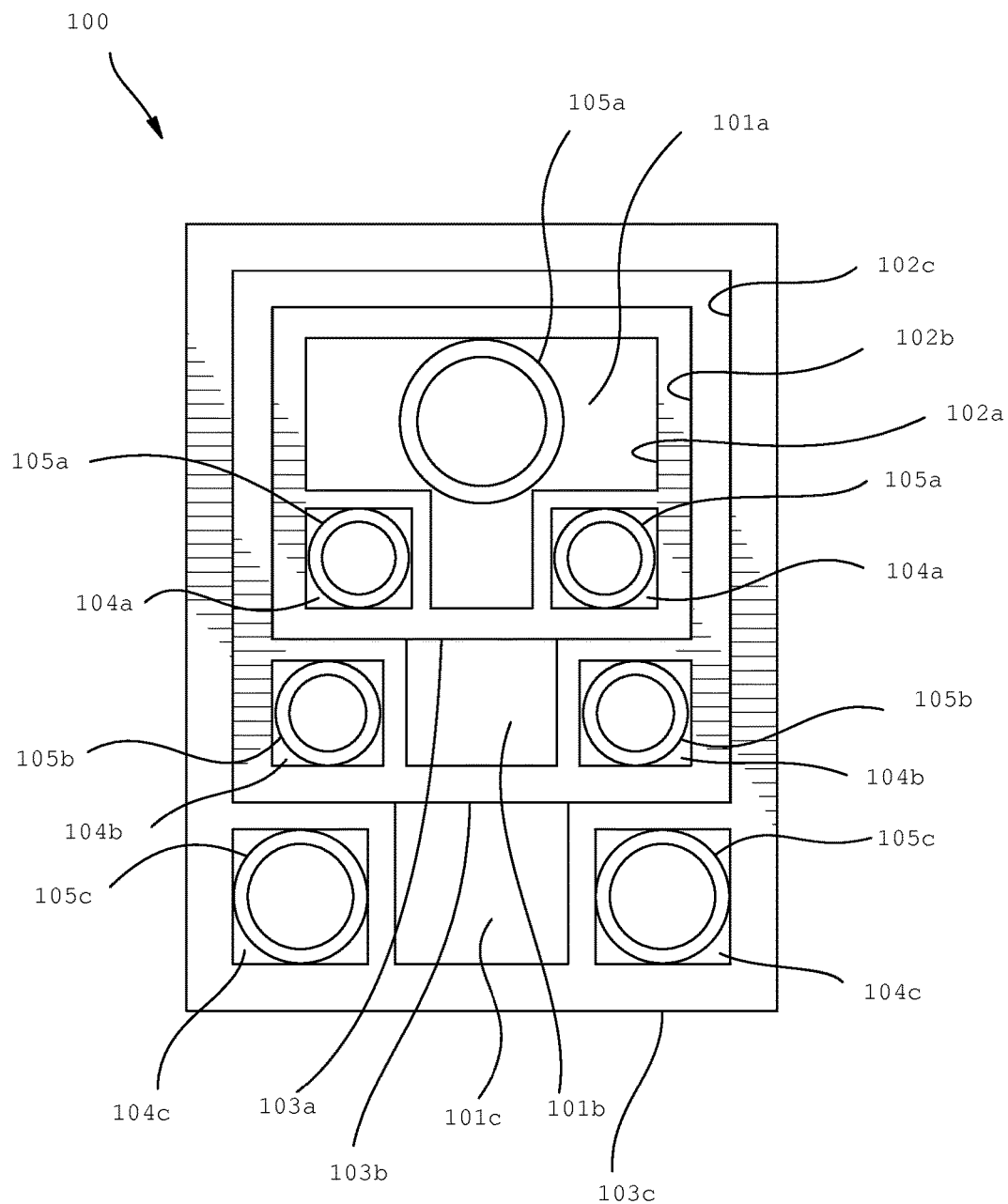
FIG. 3 shows a cross section of a cross-arm of the present invention comprising three elongated hollow structures nested together, further comprising a plurality of conduits contained therein.

In some embodiments, the present invention further comprises a conduit inside the elongated hollow structure or one or more of the compartments. While not being bound to one particular theory, a conduit provides additional strength to the cross-arm and facilitates the running of one or more wires across the length of the cross-arm. A conduit of the present invention can be comprised of construction materials used for electric and communication wiring known to those of skill in the art. In some embodiments, the conduit is a synthetic plastic polymer including, but not limited to, polyvinylchloride (PVC). FIG. 3 depicts a cross section of a cross-arm of the present invention comprising a plurality of conduits 105a, 105b, and 105c.

As will be appreciated by those of skill in the art, the compartments of the present invention are configured to receive a wire associated with a utility pole, including, but not limited to grounding wires, structural wires, power lines, telephone lines, coaxial cables, communication lines and the like.

The dimensions of a compartment of the present invention may vary on the intended use of the cross arm and geometry thereof. In some embodiments a cross-arm of the present invention further comprises one or more pre-drilled holes located at a point along the compartment configured to allow a screw or bolt to secure the wire inside the compartment. While not being bound to one particular theory, the screw or bolt inhibits the movement of a wire inside the compartment. In some embodiments, an elongated hollow structure of the present invention comprises and outer surface and an inner portion, the elongated hollow structure configured to receive a wire, another elongated hollow structure, or combinations thereof.

Figure 4:
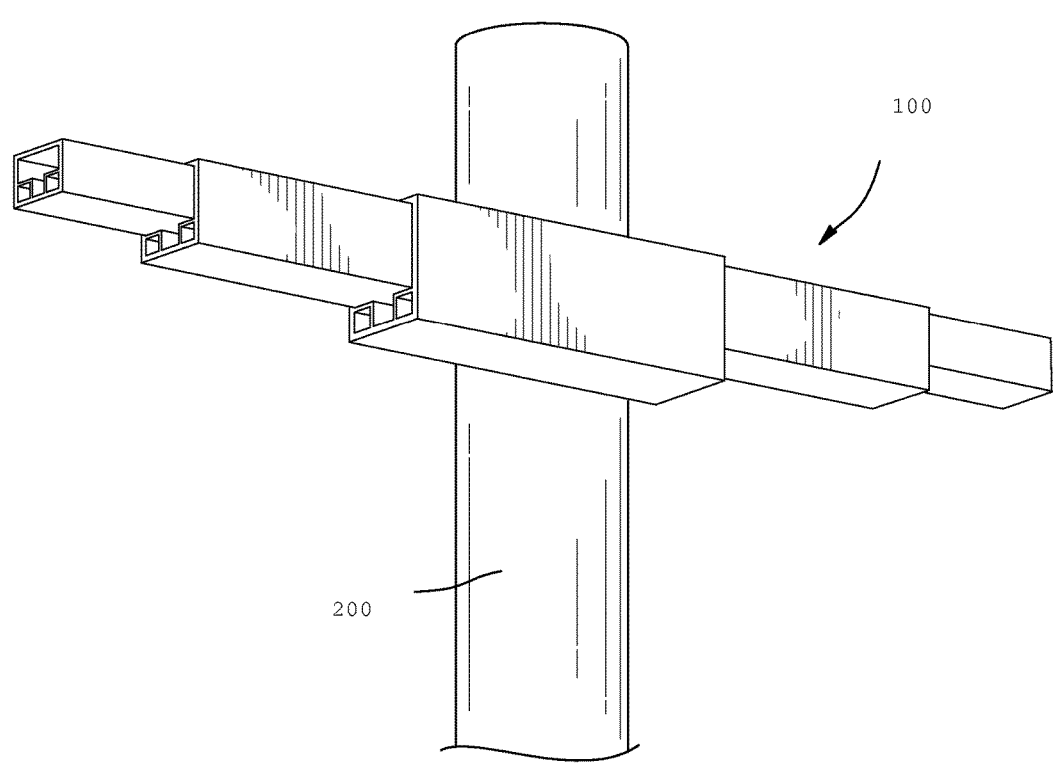
FIG. 4 shows a cross-arm of the present invention attached to a utility pole, wherein the cross-arm comprises three elongated hollow structures nested together.

In some embodiments, a cross-arm of the present invention is further configured to be attached to existing utility pole. Conventional methods known to those of skill in the art can be used to attach a cross arm of the present invention to a utility pole, including, but not limited to, bolts, pins, screws, ties, clamps, grommets, nails, pegs, anchors, rivets, and the like. In some embodiments a cross-arm of the present invention further comprises one or more pre-drilled holes that facilitate the attachment of the cross arm to the utility pole. FIG. 4 depicts a cross-arm of the present invention (100) attached to a conventional utility pole (200).

Figure 5:
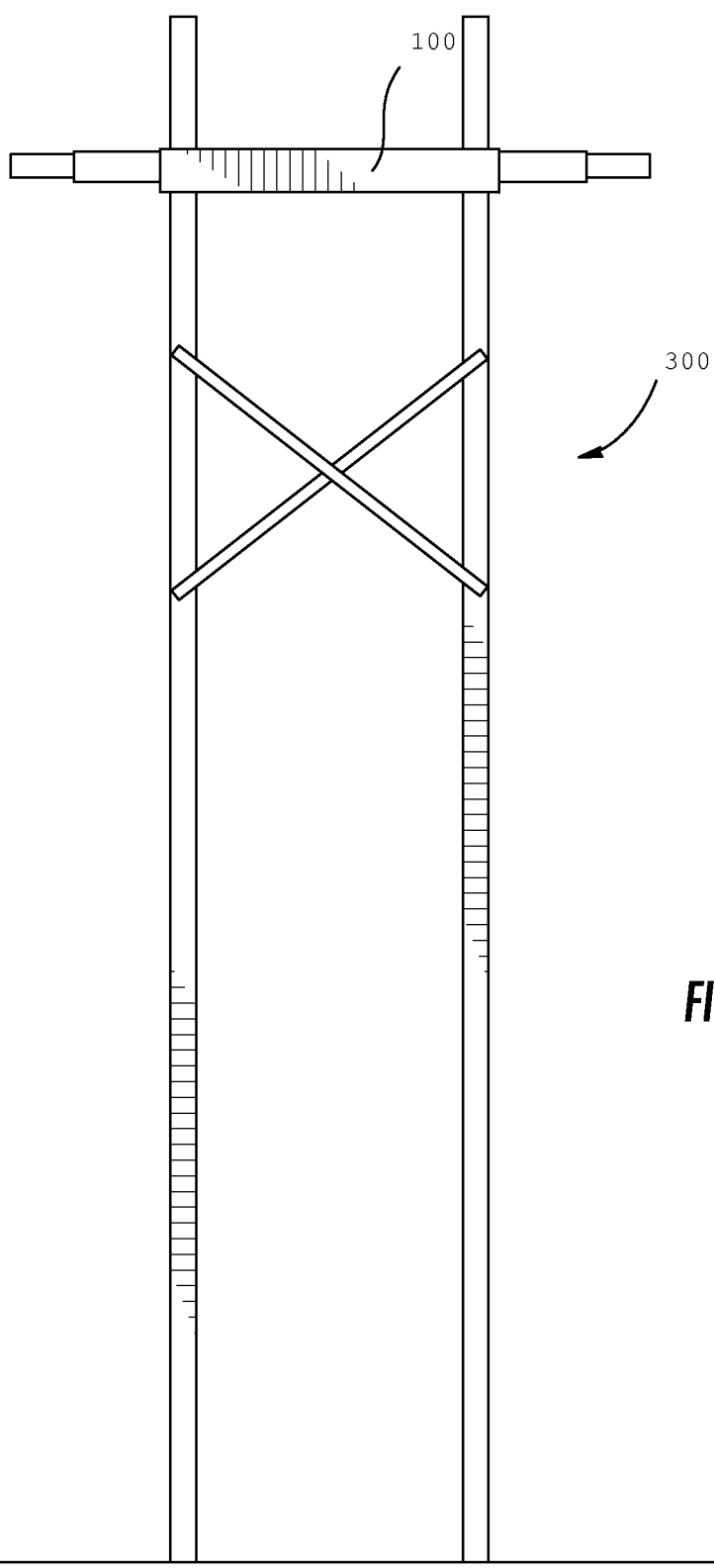
FIG. 5 shows a cross-arm of the present invention attached to a H-frame utility pole, wherein the cross-arm comprises three elongated hollow structures nested together.

In some embodiments, a cross-arm of the present invention is configured to be attached to "H-Frame" utility poles known to those of skill in the art. H-Frame utility poles are described in U.S. Pat. No. 8,322,105, which is incorporated by reference in its entirety. FIG. 5 depicts a cross-arm of the present invention (100) attached to an H-Frame utility pole (300).

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments is are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

I claim:

1. A pultruded or extruded cross arm structure for a utility pole, comprising an elongated hollow structure having a length, an outer surface and an inner portion, the inner portion comprising one or more compartments configured to receive a wire, wherein each of the one or more compartments comprises a cavity inside the elongated hollow structure defined by the inner portion and one or more partitioning walls coupled to the inner portion.

2. The cross arm of claim 1, wherein the one or more compartments extend the length of the elongated hollow structure.

3. The cross arm of claim 1, wherein the one or more compartments further comprise a conduit located within the compartment.

4. The cross arm of claim 1, wherein the inner portion further comprises insulating material.

5. The cross arm of claim 4, wherein the insulating material is foam.

6. A pultruded or extruded cross arm structure for a utility pole, comprising:
   a plurality of elongated hollow structures each having a length, an outer surface and an inner portion, each of the inner portions comprising one or more compartments configured to receive a wire,
   wherein each of the plurality of elongated hollow structures are nested coaxially, and wherein each of the one or more compartments comprises a cavity inside the elongated hollow structure defined by the inner portion and one or more partitioning walls coupled to the inner portion.

7. The cross arm of claim 6, wherein the one or more compartments extend the length of the elongated hollow structure.

8. The cross arm of claim 6, wherein the one or more compartments further comprise a conduit located within the compartment.

9. The cross arm of claim 6, wherein the inner portions further comprises insulating material.

10. The cross arm of claim 9, wherein the insulating material is foam.

11. The cross arm of claim 6, wherein each of the elongated hollow structures have different lengths.

12. A utility pole having a pultruded or extruded cross arm structure comprising an elongated hollow structure having a length, an outer surface and an inner portion, the inner portion comprising one or more compartments configured to receive a wire, wherein each of the one or more compartments comprises a cavity inside the elongated hollow structure defined by the inner portion and one or more partitioning walls coupled to the inner portion.

13. A utility pole having a pultruded or extruded cross arm structure comprising a plurality of elongated hollow structures each having a length, an outer surface and an inner portion, each of the inner portions comprising one or more compartments configured to receive a wire, wherein each of the plurality of elongated hollow structures are nested coaxially, and wherein each of the one or more compartments comprises a cavity inside the elongated hollow structure defined by the inner portion and one or more partitioning walls coupled to the inner portion.

* * * * *